(12) United States Patent
Chang

(10) Patent No.: US 11,028,961 B1
(45) Date of Patent: Jun. 8, 2021

(54) TIGHTENING STRUCTURE OF MUSICAL INSTRUMENT STAND

(71) Applicant: REMARKABLE Company, Taichung (TW)

(72) Inventor: Ming Yi Chang, Taichung (TW)

(73) Assignee: Remarkable Company, Taichung (TW)

( * ) Notice: Subject to any disclaimer, the term of this patent is extended or adjusted under 35 U.S.C. 154(b) by 6 days.

(21) Appl. No.: 16/727,444

(22) Filed: Dec. 26, 2019

(51) Int. Cl.
*F16M 11/10* (2006.01)
*G10D 13/00* (2020.01)

(52) U.S. Cl.
CPC ............ *F16M 11/10* (2013.01); *G10D 13/00* (2013.01); *F16M 2200/024* (2013.01)

(58) Field of Classification Search
CPC ... F16M 2200/022; F16M 11/10; G10D 13/28
See application file for complete search history.

(56) References Cited

U.S. PATENT DOCUMENTS

| | | | | |
|---|---|---|---|---|
| 4,141,272 A * | 2/1979 | Yanagisawa | ............ | G10D 13/02 84/421 |
| 6,162,978 A * | 12/2000 | Chang | .................... | G10D 13/00 84/421 |
| 6,838,602 B2 * | 1/2005 | Chang | .................... | F16C 11/10 84/327 |
| 6,872,023 B2 * | 3/2005 | Liao | ...................... | F16C 11/103 403/110 |
| 7,395,994 B1 | 7/2008 | Sikra | | |
| 7,943,840 B2 * | 5/2011 | Yoshino | ................. | G10D 13/02 84/421 |
| 8,226,053 B2 * | 7/2012 | Yu | ............................ | G10G 7/00 248/122.1 |
| 8,759,654 B2 * | 6/2014 | Nakata | ................... | G10D 13/28 84/421 |
| 8,894,316 B2 * | 11/2014 | Kallas | .................... | F16M 11/14 403/90 |
| 9,208,761 B2 * | 12/2015 | Miyajima | .......... | F16M 11/2021 |
| 9,633,635 B2 * | 4/2017 | Liao | ........................ | F16B 2/065 |
| 9,966,050 B2 * | 5/2018 | Krol | ....................... | G10G 5/005 |
| 2010/0276928 A1 * | 11/2010 | Chang | .................. | F16B 7/1418 285/420 |

(Continued)

*Primary Examiner* — Bradley Duckworth
(74) *Attorney, Agent, or Firm* — Thomas J. Nikolai; DeWitt LLP

(57) ABSTRACT

A tightening structure of a musical instrument stand includes stationary or immovable member and a movable member. The movable member includes a cylindrical shaft extending outward in an axial direction. One side of the immovable member has a recess. A bottom of the recess forms a semi-circular arc with a radius of curvature corresponding to that of the shaft. When the shaft is inserted into the recess it abuts against the bottom of the recess. The immovable member has a screw hole communicating with the recess. The screw hole is perpendicular to the axial direction of the cylindrical shaft. A fastening bolt is screwed into the screw hole. One end of the first fastening bolt is inserted into the recess and has a flared end portion to press against the shaft, and another end is connected with a handle. By rotating the handle, the flared end portion is drawn against the shaft, thereby rendering the movable member stationary.

4 Claims, 7 Drawing Sheets

(56) References Cited

U.S. PATENT DOCUMENTS

2011/0052312 A1* 3/2011 Chang .................... G10D 13/02
　　　　　　　　　　　　　　　　　　　　　　403/65
2014/0356048 A1* 12/2014 Chou .................... F16B 7/0493
　　　　　　　　　　　　　　　　　　　　　　403/57

* cited by examiner

TIGHTENING STRUCTURE OF MUSICAL INSTRUMENT STAND

CROSS REFERENCE TO RELATED APPLICATIONS

None

STATEMENT OF GOVERNMENT INTEREST

None

BACKGROUND OF THE INVENTION

I. Field of the Invention

The present invention relates to a musical instrument stand, and more particularly to a tightening structure of a musical instrument stand.

II. Discussion of the Prior Art

Some instruments, such as drums, cymbals, etc., are disposed at predetermined positions for percussion to produce musical sounds. However, different musicians have their own comfortable percussion habits, so it is necessary to be able to adjust the setting angle of the instrument.

U.S. Pat. No. 7,395,994 discloses a percussion instrument arm adapter. An angle adjusting device is provided between a support rod and a musical instrument to be held. The angle adjusting device includes a stationary toothed disc and a movable toothed disc. When the two are separated from each other, the movable toothed disc can be pivoted relative to the stationary toothed disc, thereby changing the setting angle of the instrument. When the teeth of the movable toothed disc are engaged with the teeth of the stationary toothed disc, the movable toothed disc becomes locked, thereby holding the instrument at a desired preset angle. However, in the conventional structure, the angle of the musical instrument is adjusted based on the slot width of the teeth of the movable and stationary toothed discs, and only an integer multiple of the slot width serves as the adjustment extent. It is almost impossible to make a fine adjustment as desired, so that users cannot adjust the instrument to their most suitable position.

On the other hand, the angle adjusting device is further provided with a tightening bolt. After the instrument is adjusted to the desired angle, the tightening bolt is tightened causing the movable toothed disc to be firmly engaged with the stationary toothed disc. The process of operating the tightening bolt takes a lot of time and effort to manipulate resulting in inconvenience in use.

Accordingly, the inventor of the present invention has endeavored, based on his many years of practical experiences, to solve these problems with the prior art.

SUMMARY OF THE INVENTION

The primary object of the present invention is to provide a tightening structure of a musical instrument such that the setting angle of the musical instrument can be steplessly adjusted as desired, and the locking operation of the musical instrument stand is improved.

In order to achieve the above object, an improved tightening structure for a musical instrument stand is provided. The improved tightening structure comprises a movable member, an immovable member, and a first fastening bolt. The movable member has a first connecting portion for connecting a first arm of the musical instrument stand. The movable member is provided with a cylindrical shaft extending outward in an axial direction of the cylindrical shaft. The immovable member has a second connecting portion for connecting a second arm of the musical instrument stand. One side of the immovable member is shaped to form a recess. A bottom of the recess is in the forms of a semicircular arc with a radius of curvature corresponding to that of the cylindrical shaft. The shaft is inserted into the recess and abuts against the bottom of the recess. The immovable member is provided with a first screw hole leading to a top of the recess. The first screw hole is perpendicular to an axial direction of the cylindrical shaft. The first fastening bolt is screwed in the first screw hole. One end of the first fastening bolt is inserted into the recess and has a flared end portion. Another end of the first fastening bolt is connected with a handle. When the handle is rotated, the flared end portion is driven to abut against the shaft of the movable member, thereby fixing the movable member.

In an embodiment, the first connecting portion includes a through hole configured to receive the first arm and an elongate slot that extends in a direction that is the same as that of the through hole and communicates with the through hole laterally. The movable member is provided with a second screw hole communicating with the elongate slot. A second fastening bolt is screwed to the second screw hole. The elongate slot is provided with an elongate pad. The elongate pad has a first side that is tightly pressed by the second fastening bolt and a second side that is in close contact with the first arm so as to fix the first arm.

Preferably, the movable member is provided with a pin hole communicating with the elongate slot. The elongate pad is provided with a perforation corresponding in position to the pin hole. A pin is inserted in the pin hole and the perforation.

Preferably, the second side of the elongate pad is formed with a concave arc portion corresponding in shape to the first arm.

DETAILED DESCRIPTION OF THE PREFERRED EMBODIMENTS

Embodiments of the present invention will now be described, by way of example only, with reference to the accompanying drawings.

Figure 1:
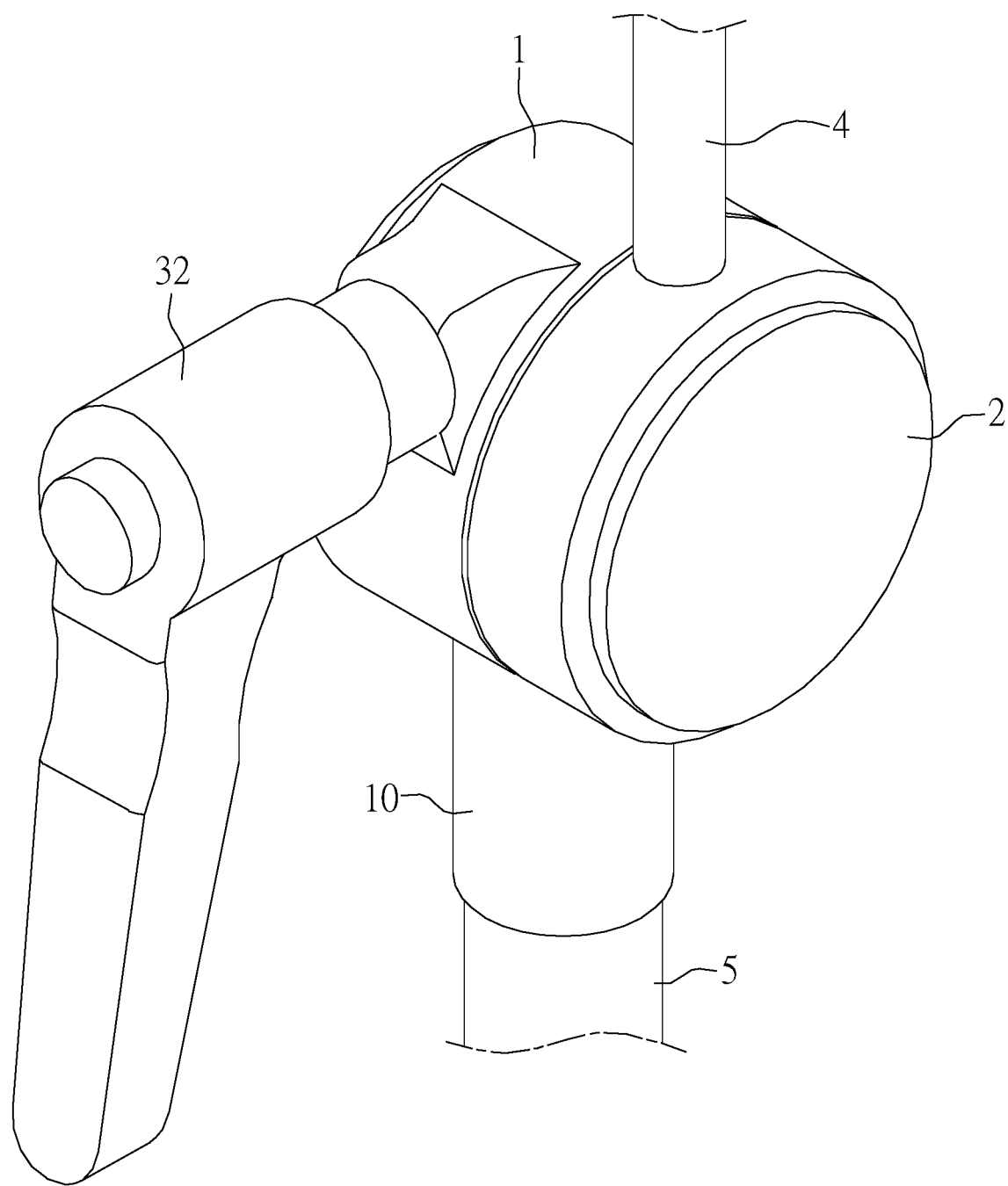
FIG. 1 is a perspective view according to a first embodiment of the present invention.
Figure 2:
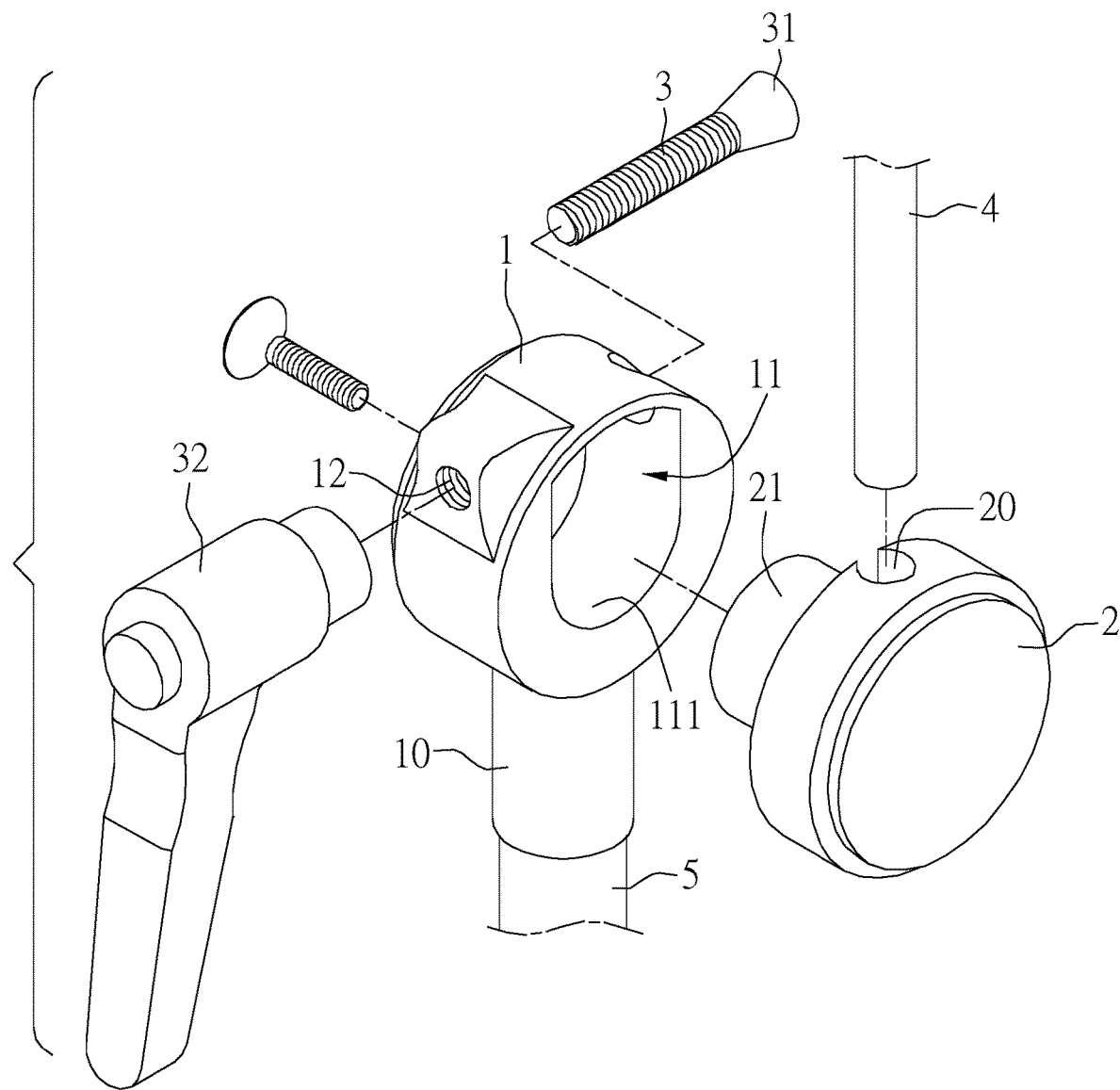
FIG. 2 is an exploded view according to the first embodiment of the present invention.

Referring to FIG. 1 and FIG. 2, a tightening structure of a musical instrument stand according to a first embodiment of the present invention comprises an immovable member 1 and a movable member 2 able to rotate relative to the immovable member 1. The movable member has a first connecting portion 20 for connecting a first arm 4 of the musical instrument stand. The immovable member 1 has a second connecting portion 10 for connecting a second arm 5 of the musical instrument stand. The setting angle of the first arm 4 of the musical instrument stand can be adjusted by rotating the movable member 2.

Figure 3:
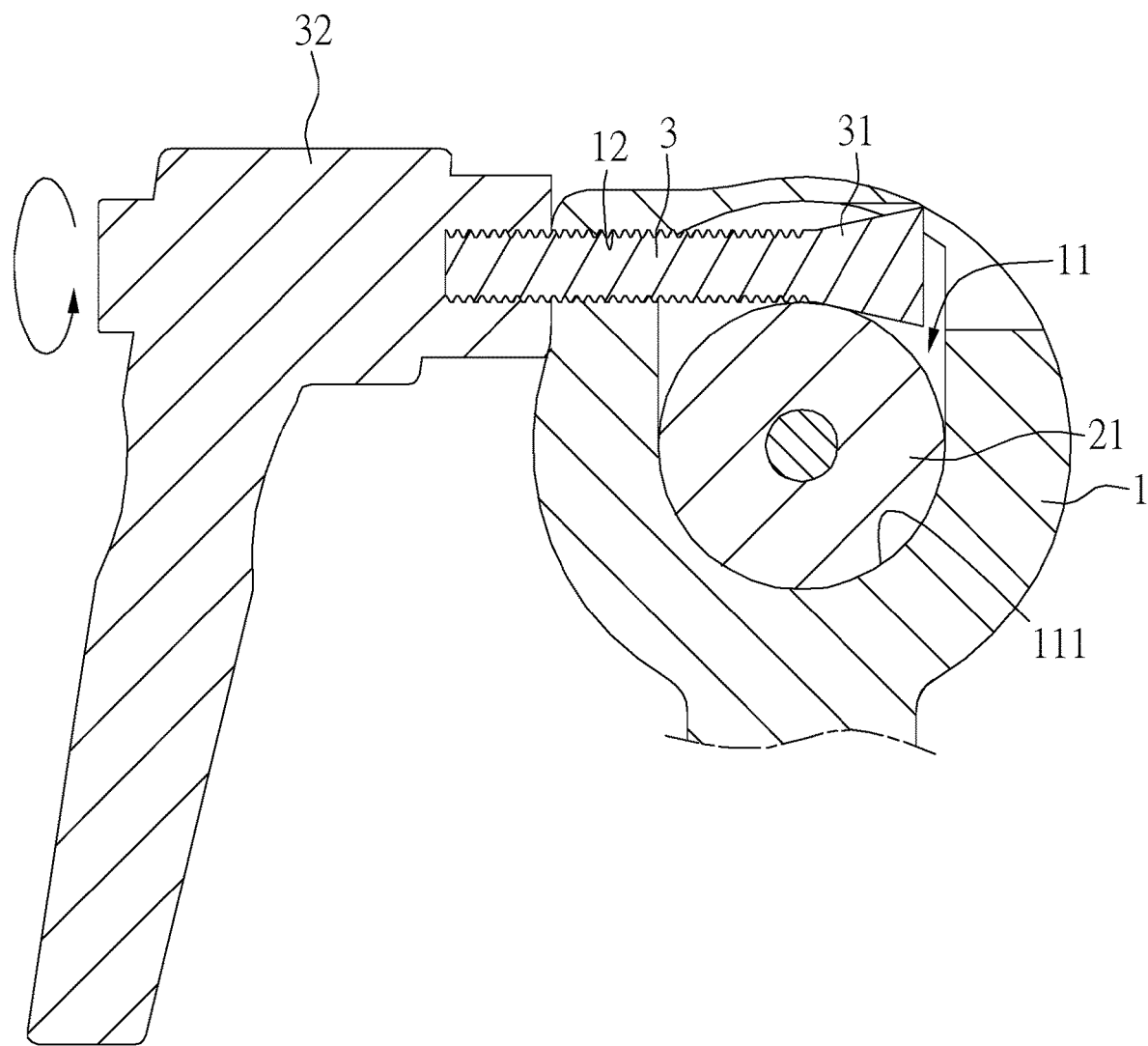
FIG. 3 is a sectional view of the immovable member according to the first embodiment of the present invention when in use.

One side of the movable member 2 is provided with a cylindrical shaft 21 extending outward in an axial direction. One side of the immovable member 1 is recessed to form a recess 11. The bottom 111 of the recess 11 forms a semi-circular arc with a radius of curvature corresponding to that of the shaft 21. The axially directed shaft 21 is inserted into the recess 11 and abuts against the bottom 111 of the recess 11, as shown in FIG. 3. The top of the recess 11 extends upward and there is still a space above the shaft 21. The immovable member 1 is provided with a first screw hole 12 leading to the top of the recess 11. The first screw hole 12 extends in a direction perpendicular to the axial direction of shaft 21. A first fastening bolt 3 is screwed in the first screw hole 12. One end of the first fastening bolt 3 is inserted into the recess 11 and has a flared end portion 31 with an increasing outer diameter. Another end of the first fastening bolt 3 extends out of the immovable member 1 and is connected with a handle 32. Rotating the handle 32 can drive the first fastening bolt 3 to rotate.

As shown in FIG. 3, the flared end portion 31 of the first tightening bolt 3 is abutted against the outer peripheral surface of the shaft 21. When the first fastening bolt 3 is driven to rotate by the handle 32, the flared end portion 31 moves toward the shaft 21 and gradually abuts against the shaft 21 to make it immovable due to the helical advancement effect between the first fastening bolt 3 and the threaded first screw hole 12. The movable member 2 is thus secured to the immovable member 1, thereby holding the setting angle of the musical instrument stand.

Figure 4:
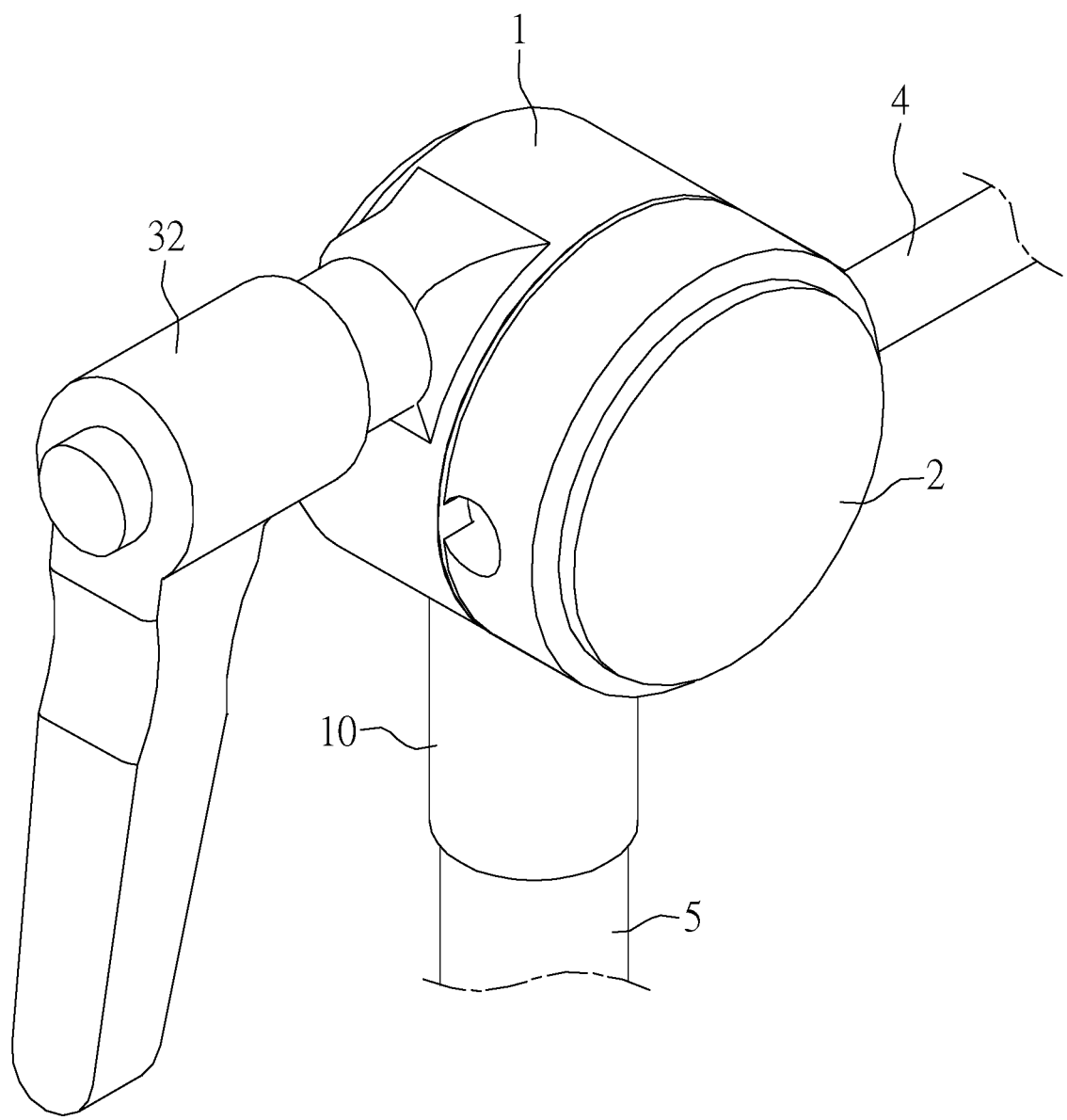
FIG. 4 is a schematic view according to the first embodiment of the present invention when in use, showing that the movable member is turned backward.

When the setting angle of the musical instrument stand is to be adjusted, the user only needs to turn the handle 32, so that the first fastening bolt 3 to retract the flared end portion 31 to move away from the shaft 21. The movable member 2 can now be turned freely, and the setting angle of the musical instrument stand can be changed. Furthermore, when the flared end portion 31 of bolt 3 is moved away from the shaft 21, the movable member 2 can be rotated as desired as shown in FIG. 4, and there is no threshold limit. Thus, the user can precisely adjust the most suitable setting angle of the musical instrument stand according to his/her usage habits.

Furthermore, as long as the flared end portion 31 of the first fastening bolt 3 contacts or leaves the shaft 21, it can quickly tighten or loosen the shaft 21. Therefore, the user does not need to turn the handle 32 greatly, and only needs to rotate the handle through a small angle to lock or unlock the movable member 2. Because the handle 32 increased the torque on the series it does not require much strength, so it is easy to operate.

Figure 5:
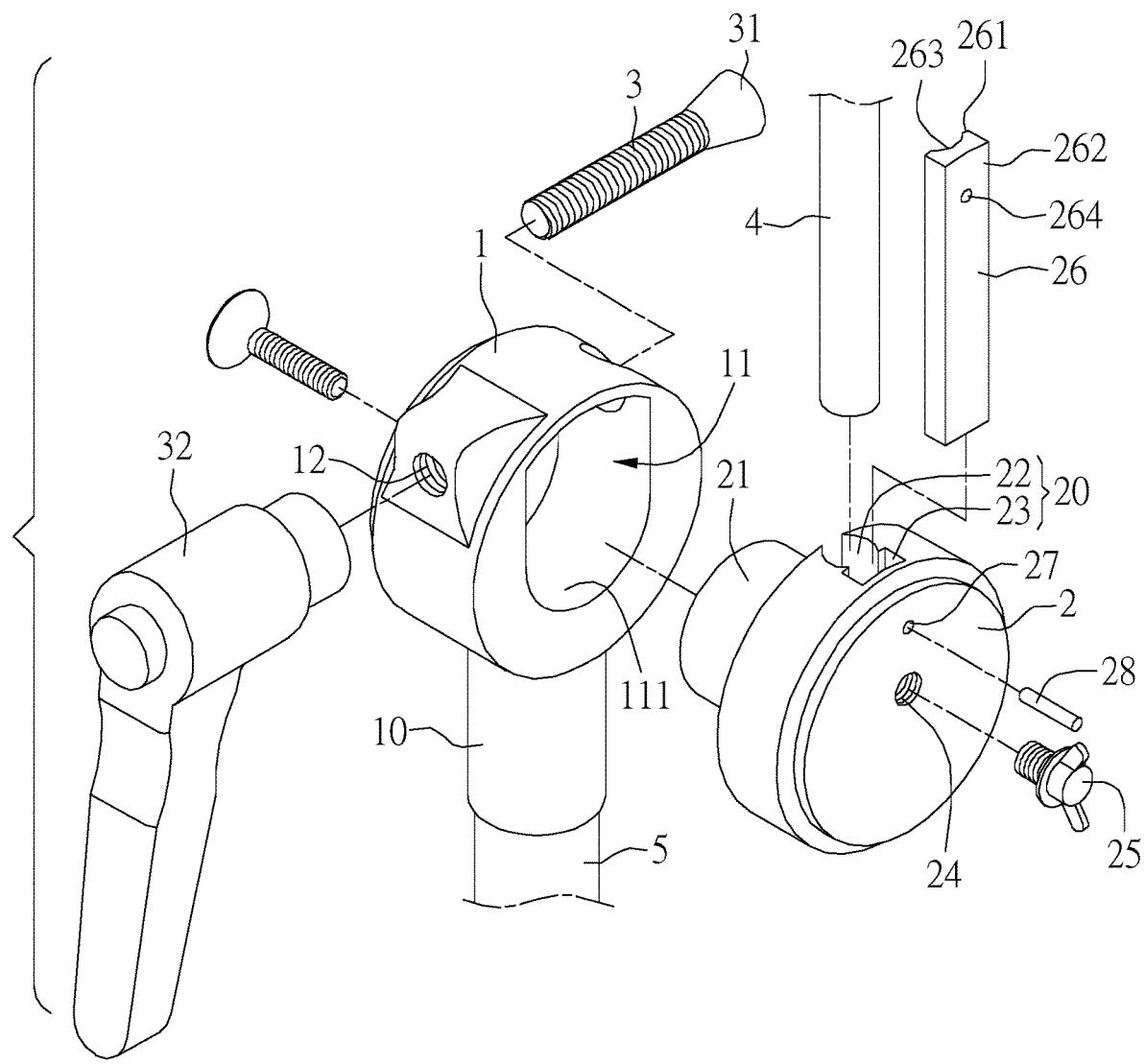
FIG. 5 is an exploded view according to a second embodiment of the present invention.

FIG. 5 illustrates a second embodiment of the present invention. The structure of this embodiment is based on the structure of the aforementioned first embodiment, and the first connecting portion 20 for connecting the first arm 4 of the movable member 2 is further improved. In this embodiment, the first connecting portion 20 includes a radially extending through hole 22 and an elongate slot 23. The through hole 22 is configured to receive the first arm 4. The elongate slot 23 extends in the same direction as the through hole 22 and intersects with the through hole 22 laterally. Another side of the movable member 2 is provided with a second screw hole 24 that enters the elongate slot 23. A second fastening bolt 25 is adapted to be screwed to the second screw hole 24.

The elongate slot 23 is provided to accept an elongate pad 26 therein. The elongate pad 26 has a first side 261 facing the second fastening bolt 25 and a second side 262 facing the first arm 4. In this embodiment, the second side 262 is formed with a longitudinally extending concave arc portion 263 corresponding in shape to the first arm 4. When the second fastening bolt 25 is tightened, it abuts against the first side 262 of the elongate pad 26, so that the elongate pad 26 has the concave arc portion 263 to be in close contact with the first arm 4. Thus, the elongate pad 26 is pressed against the first arm 4 to position the first arm 4.

Figure 6:
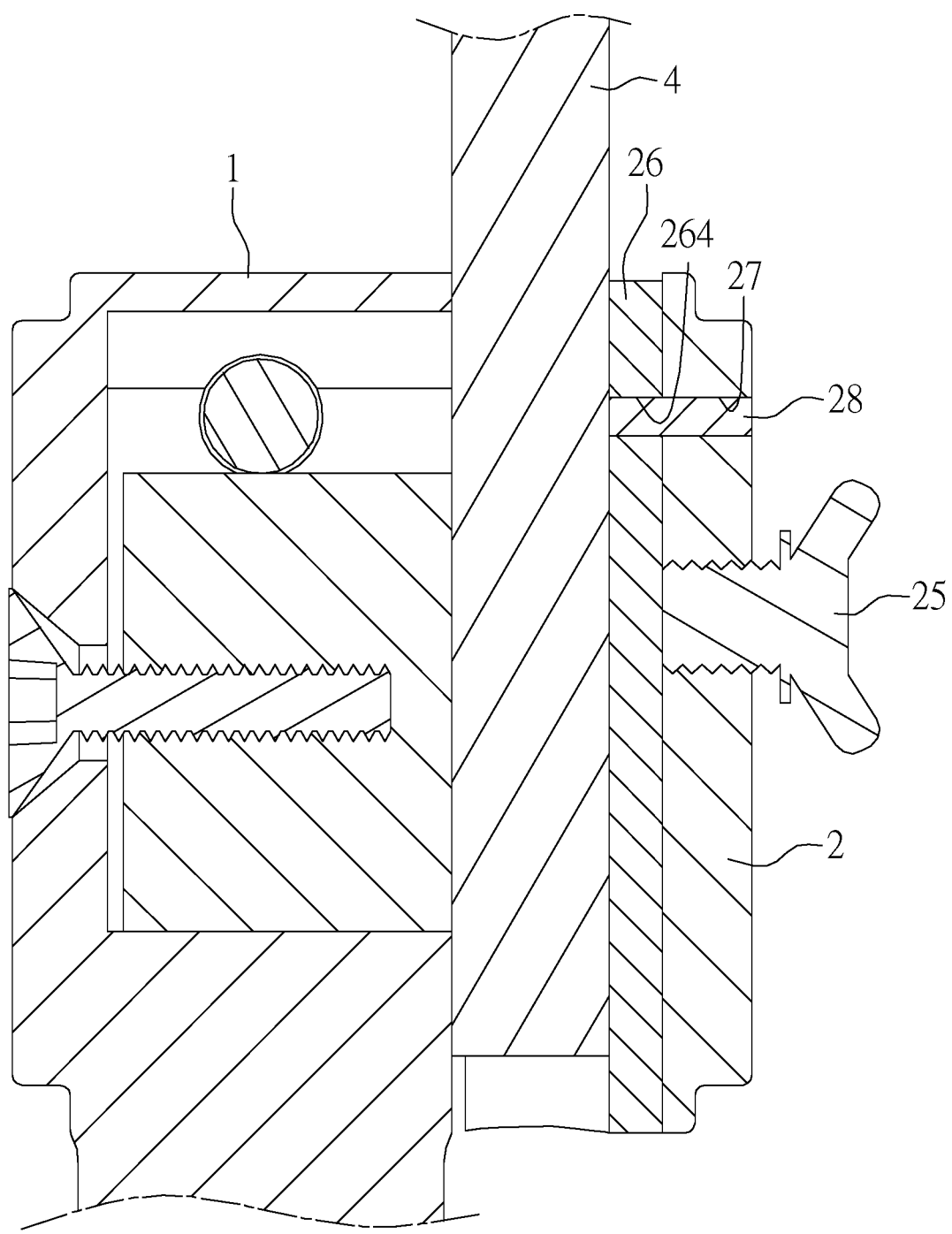
FIG. 6 is a longitudinal sectional view of the movable member according to the second embodiment of the present invention.
Figure 7:
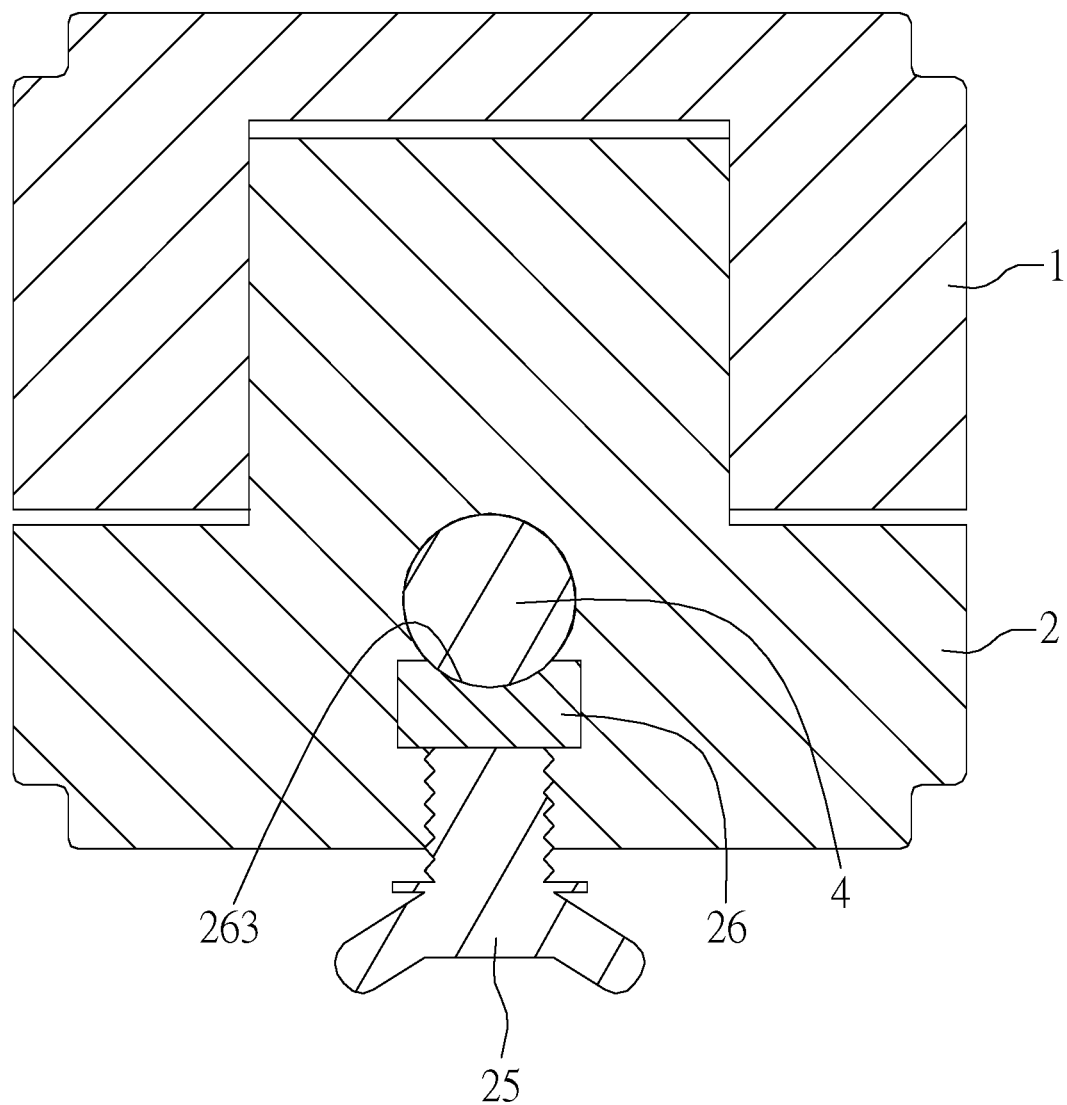
FIG. 7 is a cross-sectional view of the movable member according to the second embodiment of the present invention.

As shown in FIG. 6, although the area of the end surface of the second fastening bolt 25 is small, the second fastening bolt 25 presses the elongate pad 26 against the first arm 4. The contact area between the elongate pad 26 and the first arm 4 is very large. Therefore, it can generate a large frictional force, thereby increasing the clamping ability. On the other hand, as shown in FIG. 7, the concave arc portion 263 of the elongate pad 26 is in close contact with the first arm 4, which further increases the contact area between the elongate pad 26 and the first arm 4, thereby generating greater frictional force and clamping ability, so that the first arm 4 won't slip. Furthermore, in this embodiment, the movable member 2 is provided with a pin hole 27 (FIG. 5) leading into the elongate slot 23, and the elongate pad 26 is provided with a perforation 264 corresponding in position to the pin hole 27. As shown in FIG. 6, a pin 28 is inserted in the pin hole 27 and the perforation 264 to position the elongate pad 26, so that the elongate pad 26 is prevented from falling out of the elongate slot 23 when the second tightening bolt 25 is loosened.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A tightening structure of a musical instrument stand, comprising:
   a movable member, having a first connecting portion for connecting a first arm of the musical instrument stand; the movable member being provided with a cylindrical shaft extending outwardly therefrom;
   an immovable member, having a second connecting portion for connecting a second arm of the musical instrument stand; one side of the immovable member having a recess formed therein, a bottom of the recess forming a semi-circular arc with a radius of curvature corresponding to that of the shaft, the cylindrical shaft being inserted into the recess and abutting against the bottom of the recess; the immovable member being provided with a first screw hole passing through a top portion of the recess, the first screw hole being perpendicular to an axial direction of the cylindrical shaft;
   a first threaded fastening bolt, screwed in the first screw hole, one end of the first fastening bolt being inserted into the recess and having a flared exterior end portion, another end of the first fastening bolt being connected with a handle;

wherein when the handle is rotated, the flared end portion of the first fastening bolt is drawn against the shaft, thereby holding the movable member stationary.

2. The tightening structure of the musical instrument stand as claimed in claim 1, wherein the first connecting portion includes a through hole configured to receive the first arm and an elongate slot that extends parallel to the through hole and intersects with the through hole along their length; the movable member being provided with a second screw hole that enters the elongate slot, a second fastening bolt being screwed into the second screw hole; the elongate slot being provided with an elongate pad having a first side that is pressed by the second fastening bolt and a second side that is in contact with the first arm so as to lock the first arm against movement.

3. The tightening structure of the musical instrument stand as claimed in claim 2, wherein the movable member is provided with a pin hole that enters the elongate slot, the elongate pad being provided with a perforation corresponding in position to the pin hole, and a pin is adapted to be inserted in the pin hole and the perforation.

4. The tightening structure of the musical instrument stand as claimed in claim 2, wherein the second side of the elongate pad is formed with a concave arcuate groove corresponding in shape to a peripheral surface of the first arm.

\* \* \* \* \*